Sept. 23, 1969   H. A. PEYSER ET AL   3,468,030

DENTAL DEVICE

Filed Oct. 1, 1965

INVENTORS
HENRY A. PEYSER
DAVID J. NIVISON
BY
ATTORNEYS

United States Patent Office 3,468,030
Patented Sept. 23, 1969

3,468,030
DENTAL DEVICE
Henry A. Peyser, 573 Shelden Road, Grosse Pointe Shores, Mich. 48236, and David J. Nivison, 17120 E. Warren, Detroit, Mich. 48224
Filed Oct. 1, 1965, Ser. No. 492,117
Int. Cl. A61c 5/14
U.S. Cl. 32—34                                10 Claims

ABSTRACT OF THE DISCLOSURE

The invention relates to a dental device adapted to be placed in the mouth of a dental patient to serve as a mouth prop blocking the parotid gland and to provide absorption. The device is of generally triangular shape with rounded corners and comprises at least one layer of thin absorbent material. The triangular device is of a size to fit into the mouth between teeth and cheek with one of the surfaces of the absorbent material contacting with the inner surface of the cheek to protect the same and also to provide absorption. In the preferred form, the device also is provided with a thin layer of metal foil on the exposed surface which reflects available light thereby brightening posterior areas. The foil also produces mere images in hard-to-reach spots.

---

The invention relates to dental equipment and refers more specifically to a reflecting and absorbing member adapted to be positioned between the teeth and cheek during dental operations or the like.

In the past, dentists have used cotton rolls or the like to position the cheek from a tooth being worked on and to absorb saliva. Separate reflecting members and sometimes separate members to guard against cutting the cheek during dental operations and to space the cheek from a tooth being worked on are used simultaneously with the absorbent cotton rolls.

The cotton rolls are bulky and uncomfortable to patients and are not as efficient in absorbing saliva as dentists desire. Further, the use of a plurality of separate instruments or members during a dental operation is uncomfortable to a patient and requires considerable dental dexterity.

It is, therefore, a purpose of the present invention to provide an improved absorbing member for use by dentists or the like.

Another object is to provide a combined reflecting and absorbing member to be used in dental operations or the like for reflecting available light and absorbing contacting liquid.

Another object is to provide a combined reflecting and absorbing member for dental use adapted to be positioned between the teeth and cheek operable to reflect light toward the teeth and absorb saliva, while tending to hold the jaw open and protecting the cheek against accidental cutting.

Another object is to provide structure as set forth above which is simple in construction, economical to manufacture and efficient in use.

Other objects and features of the invention will become apparent as the description proceeds especially when taken in conjunction with the accompanying drawings illustrating a preferred embodiment of the invention wherein.

Figure 1:
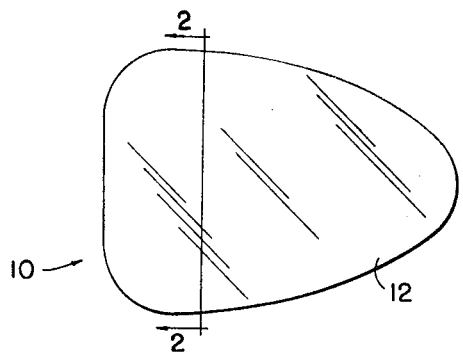
FIGURE 1 is a plan view of a reflecting and absorbing member constructed in accordance with the invention.

With particular reference to the figures of the drawing, one embodiment of the present invention will now be considered in detail.

The reflecting and absorbing member 10 illustrated in FIGURE 1 includes a metal foil member 12 bonded to two layers 14 and 16 of absorbent material such as fibrolint. In use the reflecting and absorbing member 10 is inserted in the mouth between the teeth and cheek to absorb saliva and reflect light on the teeth during a dental operation.

More specifically the metal foil member 12 may be chrome foil having a thickness of approximately .005″. The foil 12 is generally pear-shape as shown best in FIGURE 1, and is constructed so that the smaller end thereof at the right in FIGURE 1 is at the rear of the mouth when the reflecting and absorbing member 10 is in use as illustrated in FIGURE 2.

The particular foil used need not be chrome. However, it must be non-toxic, should have a reflecting quality and should have no taste or at least not an undesirable taste. While the thickness may vary somewhat the foil 12 should provide some stiffness in use with the fibrolint. The chrome foil 12 as shown has an adhesive backing by which it is bonded to the fibrolint layer 14.

The absorbent layers 14 and 16 may be of any absorbent material having the requisite absorbing qualities which is non-toxic without an undesirable taste. The absorbent material may be in a single layer approximately .06″ in thickness or may be built up of a plurality of layers such as layers 14 and 16 to the desired thickness. The fibrolint layers 14 and 16 shown may be secured together by any suitable adhesive and are generally of triangular shape with rounded corners as shown in FIGURE 1 to conform exactly with the shape of the metal foil member 12.

Figure 2:
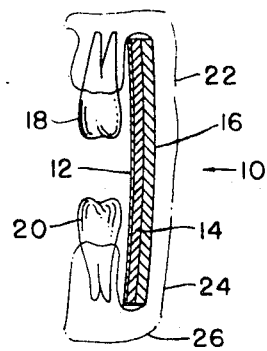
FIGURE 2 is a section view of the reflecting and absorbing member illustrated in FIGURE 1 taken substantially on the line 2—2 in FIGURE 1, and showing the absorbing and reflecting member in use.

In use as shown in FIGURE 2, the reflecting and absorbing member 10 is positioned between the upper and lower teeth 18 and 20 and the cheek 22 of a patient 24 whose jaw 26 is open. As shown in FIGURE 2 the absorbent material is placed in contact with the cheek 24 where it absorbs saliva in a particularly efficient manner. It is hypothesized that the absorbent material not only absorbs saliva but also blocks or partially blocks the saliva supplying gland duct.

The chrome foil in conjunction with the absorbent material provides strength for the reflecting and absorbing member 10 which tends to hold the jaw 26 open and thus provide more working room for the dentist. The reflecting foil 16 further reflects available light toward the teeth 18 and 20 to aid the dentist in seeing his work area.

Figure 3:
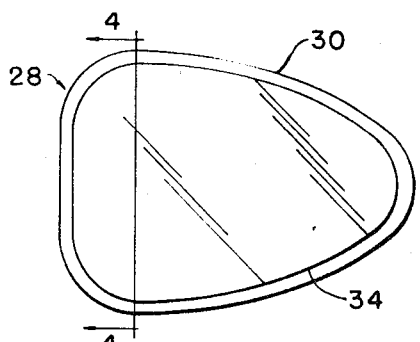
FIGURE 3 is a plan view of a modification of the reflecting and absorbing member illustrated in FIGURE 1.
Figure 4:
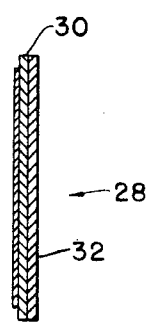
FIGURE 4 is a section view of the reflecting and absorbing member illustrated in FIGURE 3 taken substantially on the line 4—4 in FIGURE 3.

The modified reflecting and absorbing member 28 illustrated in FIGURE 3 is exactly the same as the reflecting and absorbing member 10 except that the fibrolint layers 30 and 32 extend beyond the edge of the metal foil 34 around the entire periphery thereof. Thus, with the modified reflecting and absorbing member 28 the edges of the foil will not normally contact the tender membranes of the mouth.

Figure 5:
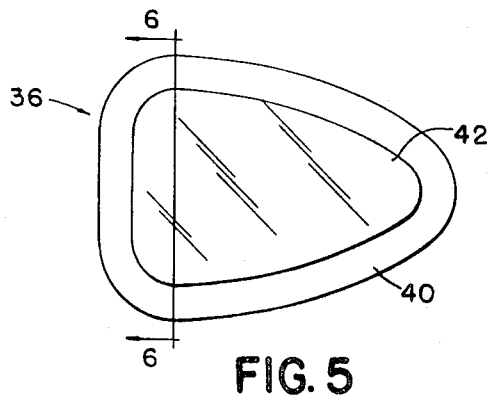
FIGURE 5 is a plan view of another modification of the reflecting and absorbing member illustrated in FIGURE 1.
Figure 6:
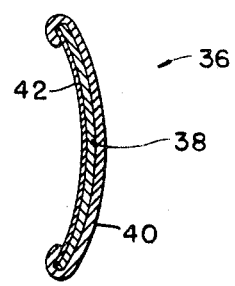
FIGURE 6 is a section view of the reflecting and absorbing member illustrated in FIGURE 5 taken substantially on the line 6—6 in FIGURE 5.

The modified reflecting and absorbing member 26 illustrated in FIGURE 5 is the same as the reflecting and absorbing members 10 and 28 except the fibrolint layers 38 and 40 are folded over the edge of the metal foil member 42 and the metal foil member 42 and fibrolint layers 38 and 40 are concave when viewed toward the metal foil member. Thus, the reflecting and absorbing member 36 more positively prevents the edge of the metal foil from contacting the membranes of the mouth, spaces the cheek further from the teeth being worked on and concentrates the light reflected more nearly centrally due to the concavity thereof.

In general all of the reflecting and absorbing members 10, 28 and 36 absorb the saliva from the mouth more efficiently than the usual cotton rolls, provide better lighting of the work area, tend to hold the patient's jaw open, and protect against accidental cutting of the cheek by dental tools. All of the reflecting and absorbing members disclosed are also disposable so that they present no sterilizing or sanitary problem. The reflecting and absorbing members 10, 28 and 36 can of course be provided in a plurality of sizes to fit the individual mouth.

While one embodiment and a number of modifications of the invention have been considered in detail, other modifications and embodiments are contemplated by the inventor. Thus similar reflecting and absorbing members can be used by surgeons, veterinarians and the like.

What we claim as our invention is:

1. A dental device adapted to be placed in the mouth of a dental patient to serve as a mouth prop and to provide absorption comprising at least one layer of thin sheet absorbent solid material having length and breadth dimensions many times greater than its thickness, said sheet being of generally triangular shape with rounded corners and of a size adapted to fit into the mouth between teeth and cheek, with a surface of said absorbent material contacting the inner surface of the cheek to protect the same and also to provide absorption.

2. Structure as set forth in claim 1 wherein said absorbent member has secured to one surface thereof a thin layer of metal foil.

3. Structure as set forth in claim 2 wherein the absorbent material extends beyond the edge of the foil a short distance around the entire periphery thereof.

4. Structure as set forth in claim 2 wherein the absorbent material is folded over the edge of the metal foil member around the entire periphery thereof.

5. Structure as set forth in claim 2 wherein the metal foil member and absorbent material are both concave viewed from the metal foil side thereof.

6. Structure as set forth in claim 5 wherein the absorbent material extends beyond the edge of the foil a short distance around the entire periphery thereof.

7. Structure as set forth in claim 5 wherein the edge of the absorbent material is folded over the the edge of the metal foil member around the entire periphery thereof.

8. Structure as set forth in claim 2 wherein the metal foil member is chrome foil approximately .005″ in thickness.

9. Structure as set forth in claim 1 wherein the absorbent material has an approximate thickness of .06″.

10. A dental device as set forth in claim 1 wherein said absorbent material is convex on the side adjacent the cheek and concave on the side adjacent the teeth.

References Cited

UNITED STATES PATENTS

| | | | |
|---|---|---|---|
| 629,324 | 7/1899 | Allen | 32—34 |
| 2,180,249 | 11/1939 | Lempert | 32—33 |
| 2,613,441 | 10/1952 | Biggs | 32—34 |
| 2,930,128 | 3/1960 | Berens | 32—35 |

ROBERT PESHOCK, Primary Examiner

U.S. Cl. X.R.

32—69; 128—12